United States Patent [19]

Skene

[11] Patent Number: 4,503,110

[45] Date of Patent: Mar. 5, 1985

[54] FOIL EMBOSSING METHOD

[76] Inventor: Paula H. Skene, 6046 Claremont, Oakland, Calif. 94618

[21] Appl. No.: 401,503

[22] Filed: Jul. 26, 1982

[51] Int. Cl.$^{3}$ .......................... B32B 3/28; B32B 31/20

[52] U.S. Cl. ...................................... 428/164; 156/59; 156/209; 156/249; 156/272.2; 156/297; 156/300; 428/15; 428/172; 428/189

[58] Field of Search ................... 428/13, 15, 164, 189, 428/209, 195, 914, 156, 172; 156/59, 63, 209, 249, 297, 300, 272.2

[56] References Cited

U.S. PATENT DOCUMENTS

| | | | |
|---|---|---|---|
| 2,133,081 | 10/1938 | Colvin | 41/19 |
| 3,480,500 | 11/1969 | Hotter | 428/914 |
| 3,523,503 | 8/1970 | O'Boyle | 101/32 |
| 3,567,538 | 3/1971 | Lind | 156/154 |
| 3,912,842 | 10/1975 | Swartz | 428/172 |

FOREIGN PATENT DOCUMENTS 2810371 6/1979 Fed. Rep. of Germany .

*Primary Examiner*—Paul J. Thibodeau

*Attorney, Agent, or Firm*—Townsend and Townsend

[57] ABSTRACT

A superimposed foil embossing method using both opaque foils and transparent pastel foils. A first flat stamping die transfers a first foil, which can be either an opaque foil or a transparent foil, from a first carrier ribbon to the paper stock. The first foil is transferred by the application of heat and pressure. A second flat stamping die transfers a transparent foil from a second carrier ribbon to the stock so that it is superimposed over the first foil. Since each foil is only transferred from the ribbon to the paper in the areas where the die touches the paper, the pastel foil can be applied directly to the paper and also superimposed over areas of the first foil. Thus, if the first foil is an opaque foil, the color combinations possible include the paper stock color, the first foil color, the altered color of the paper having the transparent foil thereon, and the altered color of the first foil with the transparent pastel foil embossed thereon. An embossing die and counter-die is usually used to emboss selected areas of the design to provide a finished, raised appearance.

8 Claims, 3 Drawing Figures

FOIL EMBOSSING METHOD

BACKGROUND OF THE INVENTION

Decorative, embossed cards are often used for the announcement of special occasions or events. These embossings are often works of art in their own right, very often accomplished only after the input of a great deal of artistic energy. A plastic film carrying what is called the foil on one side is termed a ribbon. The foil is usually a metallic opaque foil or a tinted, transparent material called a transparent pastel foil. The foil is applied to the surface of the paper stock by the application of heat and pressure to the ribbon using a flat stamping or embossing die. The surface of the flat stamping die is cut to the desired design to transfer the foil from the ribbon to the paper stock in the corresponding shape.

In the past in order to provide an embossing with, for example, three colors, it has been necessary to provide three separate sets of flat stamping dies, each one cut according to the individual color it was to transfer to the paper stock. However, each new stamping die which must be used results in an extra step in the operation as well as the extra cost associated with making the die. Further, the colors produced are limited to the colors commercially available.

SUMMARY OF THE INVENTION

The present invention solves some of the prior art problems by the superimposition of a transparent pastel foil over opaque or other transparent pastel foils thus yielding a greater number of colors in a fewer number of steps. Further, a great number of striking and unusual foil color combinations not obtainable by any other method and not available though commercial channels are possible with the present invention.

The process typically involves three primary steps. First, a flat stamping die cut to the appropriate shape transfers a first, typically opaque, foil from a ribbon having the opaque foil on one side thereof to the paper stock, typically a card. The opaque foil is generally metallic and is transferred by the application of heat and pressure. The second step uses a second flat stamping die cut in the appropriate configuration. The second die transfers a transparent pastel foil from a carrying ribbon to the card so that it is superimposed over the opaque foil. Since each transparent pastel foil, just as the opaque foil, is only transferred from the ribbon to the stock in the areas where the die touches the paper, the pastel foil can be applied directly to the paper stock and also superimposed over areas of the opaque foil. Thus the color combinations possible include the paper stock color, the opaque foil color, the altered color of the paper stock having the transparent pastel foil thereon, and the altered color of the opaque foil with the transparent pastel foil thereon. An embossing die and counter-die, to give the final embossed impression to the design, is then usually used.

If desired more than one color of opaque foil can be transferred to the paper stock. Similarly, and quite importantly, more than one color of transparent pastel foil can be used. If desired the user can superimpose one transparent pastel foil over another so that the color of the underlying paper is altered by both of the transparent foils.

A primary advantage resulting from the method of the present invention is the large number of unusual color combinations which are possible by the selective superimposition of pastel transparent foils over opaque foils, over the paper stock, and over other pastel transparent foils. These colors resulting from such superimposition of the transparent foils are not available commercially. Also, fewer colors of ribbons need be stocked. For example, if one stocks three colors for paper stock, three opaque foils and three transparent foils, a total of 48 different colors can be produced by the present method. Further, fewer stamping dies and fewer impressing steps are needed to achieve the same number of different colors on the paper stock compared with the prior art. Significant savings in time and production cost can be realized.

Additional features and advantages of the invention will appear from the following description in which the preferred embodiment has been set forth in detail in conjunction with the accompanying drawings.

DETAILED DESCRIPTION OF THE PREFERRED METHOD

The embossing method of the present invention involves three basic steps, two foil stamping steps and one embossing step.

Figure 1:
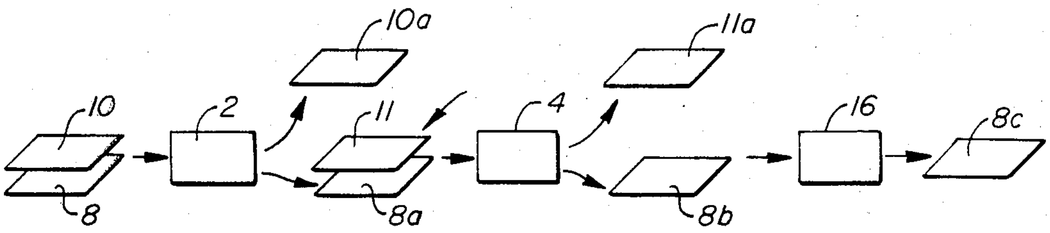
FIG. 1 is a schematic diagram of the foil stamping steps and the embossing step used in the method of the present invention.

Turning to FIG. 1, the foil stamping and embossing steps are schematically illustrated. A first ribbon 10 and a piece of paper stock 8 are placed in a first flat stamping station 2. Ribbon 10 is made of a carrier film having an appropriate opaque foil layer on the lower surface thereof. Stamping station 2 has a first flat stamping die configured to the desired shape. Only those portions of the foil layer immediately below the raised areas of the flat stamping die will be transferred to the paper stock to produce the desired design upon application of heat and pressure.

During the second foil stamping step, a second flat stamping station 4 uses a second flat stamping die with a somewhat different configuration than the first flat stamping die. A second ribbon 11, having a pastel transparent foil located on its lower surface, is placed between the second flat stamping die and paper stock **8*a*. Paper stock 8*a*** has impressed thereon opaque foil from the first impressing step. Upon application of heat and pressure, the raised areas of the second flat stamping die transfers corresponding portions of the transparent pastel foil to the paper stock. The second die generally has a somewhat different configuration from the first die so that the transparent foil is partially superimposed over the opaque foil. However, the first die can be used for the second die stamping step if complete superimposition is desired. Also, it should be understood that two or more transparent foils can be used in lieu of opaque and transparent foils. Further, more than one color of opaque foil can be used at different places on the paper stock. It is the superimposition of one transparent foil over one or more other transparent foils or over an opaque foil to produce generally otherwise unavailable colors which is the heart of this invention.

Returning now to the disclosed embodiment, the paper stock *8b*, having both opaque foil and superimposed transparent foil thereon, is placed between an embossing die and counter-die at an embossing station 16. After being embossed, paper stock *8c* is removed from the embossing station for use. This embossing step, although not critical to the invention, is generally employed to add depth to the image.

Figure 2:
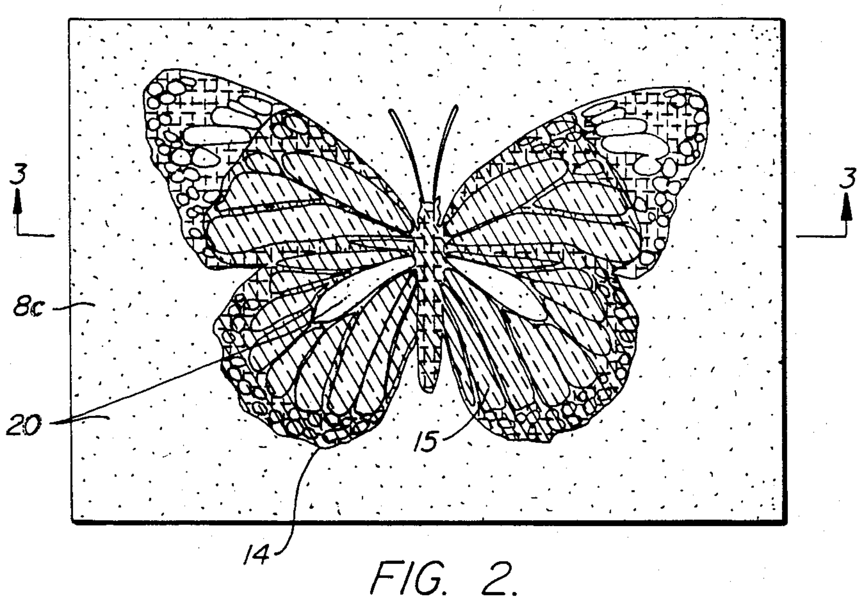
FIG. 2 is a top view of a card made according to the method of the present invention.

FIG. 2 indicates a superimposed color combination possible with present method. The surface of 20 of paper stock 8 is shown blank representing its natural color. The portions of surface 20 on which opaque foil 14 has been impressed is shown by solid lines enclosing dots. The transparent pastel foil 15 is indicated by cross-hatching. The areas in which the two overlap are the superimposed areas and offer a different visual impact from either surface 20, opaque foil 14, or transparent pastel foil 15 over surface 20.

Figure 3:
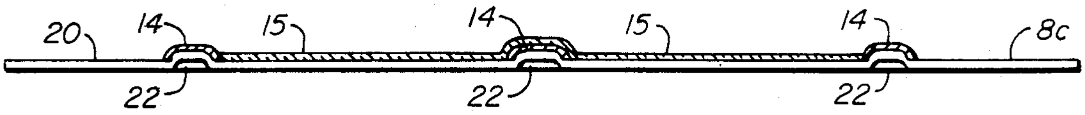
FIG. 3 is an enlarged cross-sectional view of the card in FIG. 2.

In FIG. 3 a vertically expanded, cross-sectional representation of card *8c* is illustrated. The opaque foil 14 is shown applied to surface 20 with transparent foil 15 applied either to surface 20 or superimposed on foil 14. The raised effect of embossing is illustrated by raised portions 22.

The opaque foil is preferably metallic opaque foil, however, other foils can be used as well. Transparent pastel foils generally have pale, pastel tints so that their effect upon the coloration of the opaque foil and the card background is pleasingly subtle. The term "foil" in this application is used to mean the material adhering to a carrier film which is transferred to the stock by the use of a stamping die. Further, the term "transparent pastel foil" includes not only those coatings which are pastel, but also other colors as well and coatings which may not be truly transparent but rather translucent but with sufficient clarity to allow the color of the surface to affect the perceived color of the applied transparent foil.

Modification and variation may be made to the disclosed preferred method and embodiment without departing from what is regarded as the subject of the invention as defined in the following claims.

I claim:

1. A method for impressing material on a sheet of stock to form an image on said stock comprising the following steps:

pressing, in the presence of heat, a first ribbon having a first foil layer on one side between a first die and said stock to transfer a portion of said first foil from said first ribbon onto said stock according to the shape of said first die;

placing a second ribbon having a second, transparent pastel foil layer on one side over at least a portion of the transferred first foil on said stock;

pressing, in the presence of heat, said second ribbon against said stock with a second die thereby transferring said second foil onto said stock in a second pattern, said second pattern at least partially superimposed over said first pattern; and embossing said stock between an embossing die and counter-die.

2. The method of claim 1 wherein said first foil layer is an opaque foil layer so that the superimposition of said transparent foil in said second pattern over said first opaque foil and said stock produces various color combinations.

3. The method of claim 1 wherein said first foil layer is an opaque metallic foil layer.

4. An impressed sheet of stock made according to the method of claim 1.

5. A method for impressing on a sheet of stock at least two foils comprising the following steps:

placing a first ribbon having an opaque foil on one surface thereof between a first stamping die and said paper stock with said opaque foil facing said paper stock;

pressing said first stamping die against said first ribbon and sheet of stock while heating said first ribbon and paper stock to transfer a portion of said opaque foil to said sheet of material according to the configuration of said first die;

releasing said first stamping die from said paper stock;

removing said first ribbon;

placing a second ribbon having a transparent pastel foil on one surface thereof between a second stamping die and said paper stock with said transparent foil facing said paper stock;

pressing a second stamping die against said second ribbon and sheet of stock while heating said first ribbon and paper stock to transfer a portion of said transparent foil to said paper stock to at least partially superimpose said transparent foil over said opaque foil on said sheet of stock;

releasing said second stamping die from said paper stock;

removing said second ribbon; and embossing said sheet of stock between a pair of embossing dies.

6. A method for impressing material on a sheet of stock to form an image on said stock comprising the following steps:

pressing, in the presence of heat, a first ribbon having a first foil layer on one side between a first die and said stock to transfer a portion of said first foil from said first ribbon onto said stock according to the shape of said first die;

placing a second ribbon having a second, transparent pastel foil layer on one side over at least a portion of the transferred first foil on said stock; and pressing, in the presence of heat, said second ribbon against said stock with a second die thereby transferring said second foil onto said stock in a second pattern, said second pattern at least partially superimposed over said first pattern with the number of colors produced by said foils on the stock and on one another being greater than the number of said dies.

7. A method for impressing material on a sheet of stock to form an image on said stock comprising the following steps:

pressing a first ribbon having a first foil layer on one side between a first die and said stock to transfer a portion of said first foil from said first ribbon onto said stock according to the shape of said first die;

placing a second ribbon having a second, transparent pastel foil layer on one side over at least a portion of the transferred first foil on said stock; and pressing said second ribbon against said stock with a second die thereby transferring said second foil onto said stock in a second pattern, said second pattern at least partially superimposed over said first pattern with the number of colors produced by said foils on the stock and on one another being greater than the number of said dies.

8. A method for impressing material on a sheet of stock to form an image on said stock comprising the following steps:

pressing, in the presence of heat, a first ribbon having a first foil layer on one side between a first die and said stock to transfer a portion of said first foil from said first ribbon onto said stock according to the shape of said first die;

placing a second ribbon having a second foil layer on one side over at least a portion of the transferred first foil on said stock;

pressing, in the presence of heat, said second ribbon against said stock with a second die thereby transferring said second foil onto said stock in a second pattern, said second pattern at least partially superimposed over said first pattern; and embossing said stock between an embossing die and counter-die.

* * * * *